United States Patent Office 2,807,733
Patented Sept. 24, 1957

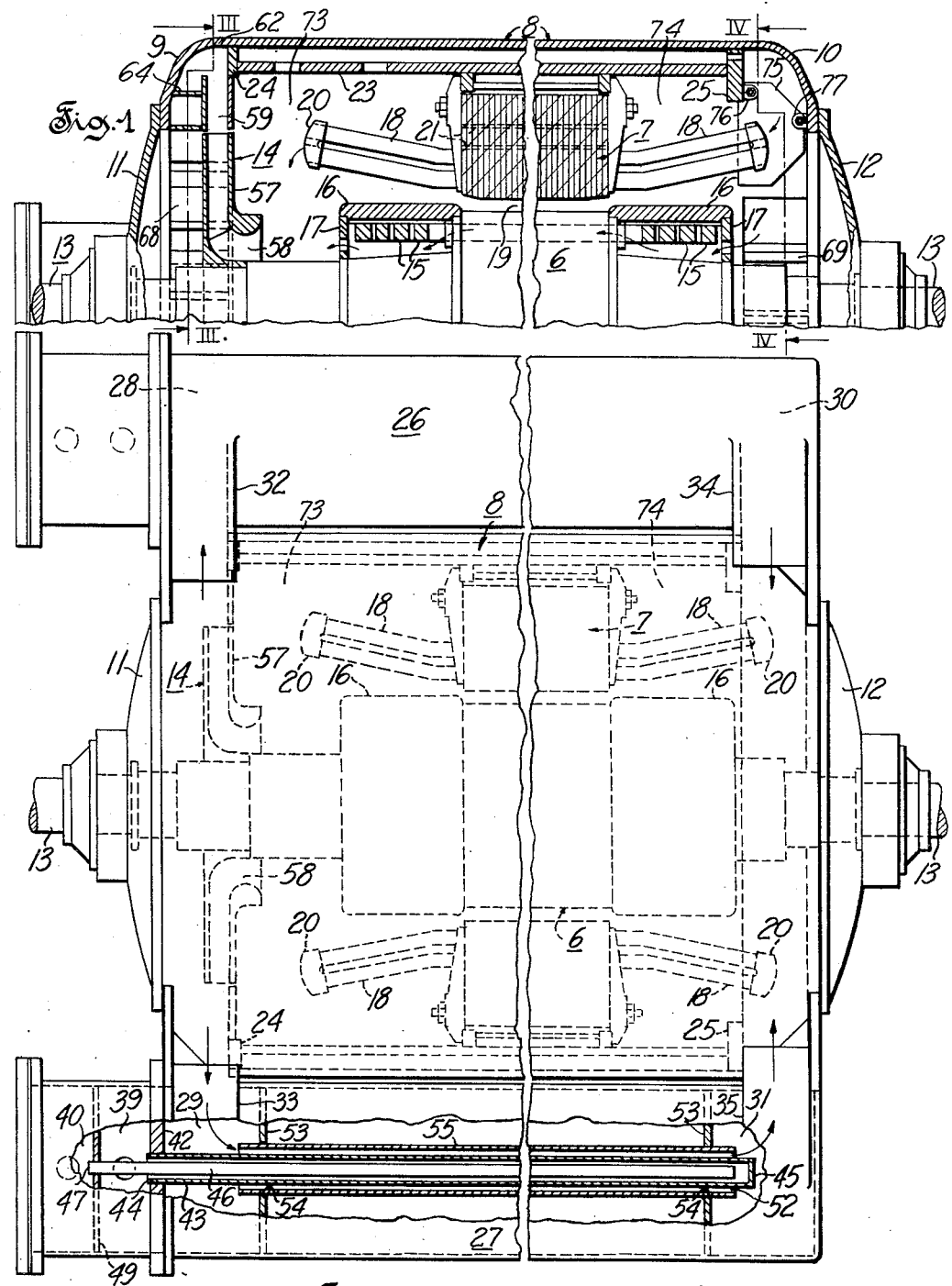

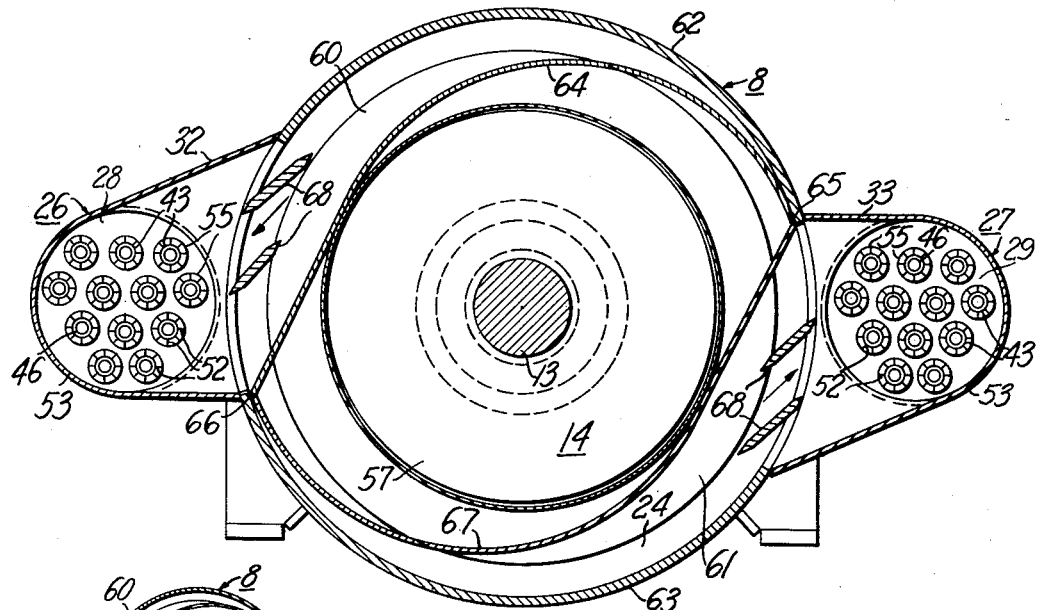
Fig. 3
Fig. 5
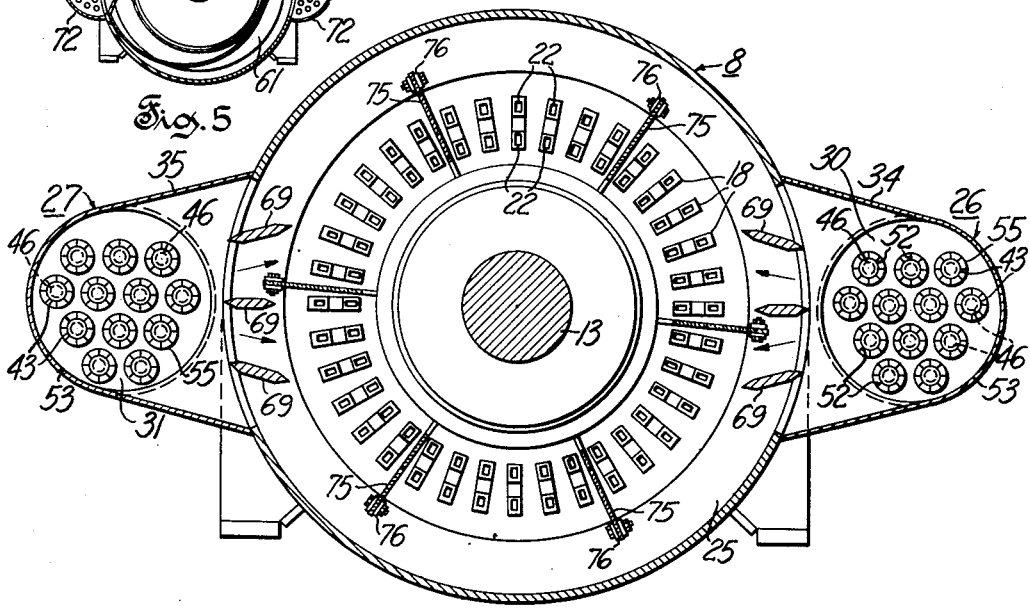
Fig. 4

2,807,733

GAS COOLED DYNAMOELECTRIC MACHINE WITH DOUBLE VOLUTE FAN DISCHARGE DIRECTLY TO COOLERS

Sterling Beckwith, Lake Forest, Ill., assignor to Allis-Chalmers Manufacturing Company, Milwaukee, Wis.

Application May 20, 1954, Serial No. 431,062

10 Claims. (Cl. 310—57)

This invention relates to the ventilation of a totally enclosed gas cooled dynamoelectric machine and more particularly to the blower and cooler arrangement for improving high pressure cooling of such a machine.

The present invention employs an arrangement of coolers and high pressure blowers for improving the cooling of a dynamoelectric machine such as a hydrogen cooled turbogenerator in which the blower forces hydrogen to circulate axially through the machine from one end to the other through axial ventilating ducts in the stator and rotor cores and coils.

In such a hydrogen cooled turbogenerator the axial ducts in the coils bring the hydrogen in substantially direct contact with the conductors and are necessarily of small transverse cross sectional area and of great length. For end to end cooling, these ducts, especially in the stator, have a length which may be over two times the core length and therefore provide considerable resistance to the flow of ventilating gas. As against the undesirable center discharge of ventilating gas from a stator coil, the more simple and practical end to end cooling doubles the length of the restricted gas passages and requires at least eight times as much fan pressure to obtain the necessary mass flow of ventilating gas through the core to limit the temperature rise of the core and conductor to a predetermined amount.

When such a hydrogen cooled turbogenerator is operated with high blower pressure and increased housing pressure, the generator power capacity may be increased or for a given capacity the physical dimensions of the generator may be substantially reduced. To take full advantage of such reduced size, the hydrogen cooled turbogenerator embodying the present invention has longitudinal coolers disposed outside of the machine to permit reduction of the housing wrapper to a smaller diameter than heretofore. The generator also has a shaft mounted high pressure blower connected by a pair of discharge volutes designed to permit use of the smaller diameter housing and direct the hydrogen into end portions of the coolers utilizing velocity components of the discharge pressure in forcing the hydrogen between the cooler tubes in the end portions of the coolers.

It is therefore an object of the present invention to provide a high pressure gas cooled dynamoelectric machine with a high pressure blower discharging directly into end portions of the machine coolers.

Another object of this invention is to provide a gas cooled dynamoelectric machine with longitudinal coolers and reduced housing diameter.

Another object of this invention is to provide a gas cooled dynamoelectric machine with outside coolers connected directly to a high pressure blower by discharge volutes within a smaller machine housing.

Another object of the invention is to provide coolers accessible for cleaning and inspection of the cooler tubes at headers at only one end of the coolers.

Another object of the invention is to provide coolers with nested cooling tubes permitting differential expansion without flexible joints or seals.

Other objects and advantages will be apparent to one skilled in the art from the following description taken with the accompanying drawings, in which:

Fig. 1 is a view in longitudinal cross section of portions of a dynamoelectric machine embodying the present invention;

Fig. 2 is a plan view of the dynamoelectric machine of Fig. 1 having a cooler with a portion of its housing broken away;

Fig. 3 is a partially diagrammatic radial cross sectional view taken along the line III—III of Fig. 1;

Fig. 4 is a view taken along the line IV—IV of Fig. 1; and

Fig. 5 is a partially diagrammatic view of a radial cross section of portions of another dynamoelectric machine embodying the present invention.

Referring to the drawing, the turbogenerator shown comprises a rotor 6 and a stator 7 enclosed by a housing normally fillable with ventilating gas such as hydrogen or other light density gas. The gas may have an average pressure equal to atmospheric pressure, but preferably has an average pressure of several atmosphere's gauge pressure. The housing includes an outer cylindrical wrapper 8 with curved end portions 9 and 10 as opposite ends of the machine integrally secured thereto to which are suitably secured end bells 11, 12.

A rotatable shaft 13 extending through end bells 11 and 12 and suitably sealed in gas tight relation therewith is supported in suitable bearings not shown. A high pressure centrifugal blower 14 is mounted on shaft 13 at one end of the machine for circulating the ventilating gas through axial ventilating passages in rotor 6 and stator 7. Rotor 6 comprises a cylindrical, slotted magnetic core provided with a field winding 15 and is suitably mounted on or integral with shaft 13. The conductors forming the rotor winding are constructed and arranged in the slots of the rotor core to provide axial ventilating ducts bringing the ventilating gas forced therethrough by blower 14 from one end of the rotor core to the other end thereof in direct contact with the metal of the conductors. Retaining rings 16 are suitably secured by apertured annular plates 17 to the rotor to support the end turns of the rotor windings at opposite ends of the rotor core and to admit ventilating gas to the rotor ducts.

Stator 7 comprises a cylindrical laminated core provided with an armature winding 18 disposed in slots of the core. The stator is disposed concentrically with the rotor and defines an air gap 19 therebetween. The conductors forming the stator winding are constructed and arranged in the slots of the stator core to provide axial stator ducts. High resistance nonmagnetic metal tubes 22 disposed between strands of the conductors form such ducts and extend longitudinally of the conductors with their open ends secured in clips 20 joining conductors extending from different stator core slots. Other axial ducts 21 may be provided in the stator core through the laminations thereof.

The stator core is supported by a frame within the housing of the machine. This frame comprises an inner annular wrapper 23 secured at opposite ends of the machine to rigid end rings 24, 25, secured to cylindrical housing 8.

Longitudinally extending coolers 26, 27 disposed outside of cylindrical housing 8 are provided for removing heat absorbed by the ventilating gas circulated through the machine. The coolers may be mounted directly on cylindrical housing 8 so that it forms part of the housing for the coolers or they may be mounted, as shown in Figs. 2, 3 and 4, spaced from housing 8. Coolers 26, 27 are uniformly circumferentially spaced, and the two coolers shown are disposed diametrically opposite each other. The coolers each have a gas cooling portion containing water cooled tubes 43, 46 and a water head portion including at one end of the cooler water receiving and water discharge headers 39, 40 for the cooling tubes.

Gas inlet ends or portions 28, 29 of the gas cooling portion of the coolers are connected to one end of the housing by suitable plates welded together to form box like ducts 32, 33, respectively, and gas outlet ends or portions 30, 31 of the coolers are connected to housing 8 by box like ducts 34, 35, so that the blower may force ventilating gas from one end of the machine through the coolers into the other end of the machine and through the air gap and the axial ducts in the stator and rotor back to the blower. Location of the coolers outside of the cylindrical housing not only reduces the volumetric gas capacity of the machine but, in permitting smaller diameter housing, reduces the stress on the outer wrapper due to higher operating pressure of gas within the machine to thus reduce the strength requirements of the housing for explosive gases.

Each cooler is of the bayonet tube type with both water heads 39, 40 axially aligned at one end of the generator. The cooling or gas enclosed portion is separated from the water heads by a gas tight wall 42. Cooling tubes 43 extend in gas tight relation through wall 42. Ends 44 of tubes 43 open in water head 39. The other ends 45 of cooling tubes 43 are closed. A tube 46 is nested or disposed concentrically within each cooling tube 43 and in spaced relation therewith. Each tube 46 is open at both ends with one end 47 extending through a wall 49 separating water heads 39, 40. Wall 49 supports the tube ends extending therethrough. Tubes 43 and 46 are thus rigidly supported against longitudinal movement in their respective headers 42, 49, but are free to expand longitudinally even with differential expansion of tubes 43 and 46. Each pair of concentric or bayonet tubes 43, 46 provide a series hydraulic connection between water heads 39, 40. Cooling fluid is supplied to the cooler headers through suitable pipes connected to a source of cooling fluid, not shown. The cover on water head 40 is removable and tube header 49 and tubes 46 are also axially removable for inspection or cleaning of tubes 43, 46 without opening the gas portion of the cooler to the atmosphere.

Cooling tubes 43 have radial fins 52 which extend longitudinally of the tubes 43 except for portions thereof in the inlet and outlet spaces of the coolers. The finned portions of tubes 43 may be radially supported directly by transverse baffle plates 53 having apertures 54 through which the tubes extend. Ventilating gas to pass through the apertures of a baffle plate is forced to flow between the fins of tubes 43. As shown, however, the fin portion of each cooling tube 43 is nested within another tube 55 extending through baffle plates 53 to provide longitudinal gas passages therebetween confining the longitudinal flow of ventilating gas through tube 55 and between the radial fins of tube 43. The fins of tubes 43 support outer gas tube 55 in concentric relation therewith. Baffle plates 53 and tubes 55 provide only nominal restraint to axial expansion of tubes 43.

In the transverse sectional views, Figs. 3 and 4, tubes 43, 46 and 55 are represented by single lines. Finned cooling tubes 43 are clustered or closely spaced to one another. Their parallel fins and associated gas ducts or tubes 55 effect a cooler having long narrow passages in which heat is removed from the ventilating gas. The long narrow passage for ventilating gas flow through the stator and rotor cores is thus well matched by the long narrow passages of the cooler so their respective gas flow and heat exchange requirements are matched for efficient cooling of the machine.

Ventilating gas is circulated by high pressure blower 14 through both coolers to the other end of the machine and through the stator and rotor cores back to the blower. Blower 14 comprises an impeller 57 having an inlet 58 open to a relatively low pressure gas chamber 73 which is between the blower and the cores. The impeller discharges ventilating gas into an annular diffuser 59 disposed concentrically of the impeller. From diffuser 59 ventilating gas enters a discharge volute which is connected to the inlet chambers 28, 29 of the coolers. The number of discharge volutes provided corresponds to the number of coolers circumferentially spaced on housing 8. To keep the size of the housing to a minimum the discharge volutes confined within the housing are displaced axially of the blower and diffuser and are constructed and arranged to provide expanding volute volume by spiralling radially inward. As shown two discharge volutes 60, 61, diametrically disposed with respect to each other and the axis of the machine, are connected to coolers 26 and 27, respectively.

Discharge volutes 60, 61 each comprise a spiral or volute shaped box extending half way around the machine. Each volute begins at a point adjacent housing 8 and axially adjacent diffuser 59. The graduated cross section of the volute enlarges as the volute spirals radially inward. Each volute is open on one side to diffuser 59 to receive ventilating gas from the diffuser. The radially outer wall of volute 60 comprises the upper circumferential portion 62 of the outer cylindrical housing extending between the coolers. Radially inner wall of volute 60 comprises a wrapper or curved plate 64 joined at the narrowest point of volute 60 to outer housing 8 at top edge 65 of duct 33 to cooler 27 and to give the voluted spiral expanding volume the plate curves radially inward and joins outer housing 8 diametrically opposite its beginning point at the bottom edge 66 of duct 32 to cooler 26.

Similarly, volute 61 discharging to cooler 27 comprises portion 63 of housing 8 between the coolers, and an inner wall 67. Volute 61, at its narrowest point, is formed of a curved plate 67 joined to housing 8 at the lower edge 66 of duct 32 to cooler 26. Plate 67 curves radially inward and joins housing 8 at the top edge 65 of duct 33 to cooler 27. Opposite ends of the radially inner walls 64, 67 of volutes 60, 61, are thus joined at diametrically opposite points 65, 66 in housing 8.

Guide vanes 68 are secured to the housing and end ring 24 and within the opening in the housing to ducts 32, 33 to guide ventilating gas from blower 14 directly into the inlet portions of the coolers which serve as collectors or high pressure chambers for the ventilating gas discharged from the blower.

Volutes 60, 61, guide vanes 68, and the inlet chambers of the coolers are thus arranged so that ventilating gas discharged by the blower flows circumferentially and discharges substantially tangentially of the housing into the coolers and transversely of the unfinned portion of tubes 43. The velocity components of the gas discharged from the blower are utilized in this arrangement to force the ventilating gas between the cooler tubes in the inlet or collector chambers of the coolers.

Guide vanes 69 are secured to housing portion 10 and an end ring 25 at the other end of the machine where ventilating gas from the coolers enters a relatively high pressure gas chamber 74. Guide vanes 69 diverge from each other to direct the ventilating gas radially inward and circumferentially in opposite directions in chamber 74. Baffle plates 75 of electrically nonconductive material extend axially and radially between end turns of stator winding 18. These baffle plates are bolted to ear supports 76 on end ring 25 and to ear supports 77 on the end bell portion 10 of the housing. Baffle plates 75 are circumferentially spaced from each other to subdivide gas chamber 74 to baffle ventilating gas supplied thereto so that the ventilating gas does not whirl past inlets or open ends of the ducts formed in the stator conductors located in clips 20.

In the operation of the dynamoelectric machine the blower forces ventilating gas into the diffuser and through the diametrically opposite discharge volutes into the inlets or collector chambers of the coolers. Gas discharged from the blowers is thus subdivided with one portion directed into one cooler and the other portion into the other cooler. Through each cooler the ventilating gas flows longitudinally thereof parallel with the cooling tubes and discharges from the coolers into the other end of the machine. The ventilating gas in a space at the other end of the machine is still under relatively very high pressure. From this space, the ventilating gas flows in parallel paths axially through the air gap and the longitudinal ducts provided in the stator and rotor cores back to the blower for recirculation through the cooler and the machine.

As shown in Fig. 5, the dynamoelectric machine embodying the present invention may have coolers 70, 71, which appear as longitudinally extending bubbles on the cylindrical housing 8. The housing for each of the coolers comprises a cylindrical portion of a tube 72 secured by welding to housing 8. The cylindrical portion of housing 8 on which the tube is secured forms the radially inner wall of the cooler. Housing 8 is apertured at opposite ends of the machine to provide openings aligned with the inlet and outlet of the cooler. This arrangement further reduces the overall size of the machine from that shown in Figs. 1 and 2, and brings the inlet of the cooler which serves as a gas collector chamber closer to the discharge of the blower. Longitudinally extending bayonet type cooling tubes, as shown in Figs. 1 to 4, are thus brought closer to the discharge of the blower for better utilizing blower discharge velocity in dispersing the ventilating gas across the cooling tubes in the inlet of the cooler. This arrangement further maintains the advantage of great strength offered by a cylindrical housing and a cylindrical cooler to withstand high gas pressures within the housing.

Although but one embodiment of the present invention is shown and described, it will be apparent to one skilled in the art that various changes and modifications may be made therein without departing from the spirit of the invention or from the scope of the appended claims.

It is claimed and desired to secure by Letters Patent:

1. A totally enclosed gas cooled dynamoelectric machine comprising a cylindrical housing, a longitudinally extending cooler disposed longitudinally of said housing on the outside of said housing, a rotatable shaft, a high pressure centrifugal blower mounted on said shaft at one end of said machine, a discharge volute directing ventilating gas from said blower directly into the inlet end of said cooler at one end of said housing, said volute expanding and spiralling radially inward, said volute directing ventilating gas from said blower directly into the cooler in the inlet end thereof which serves as a high pressure collector chamber for ventilating gas discharged from said blower for circulation through said cooler to the other end of said housing, thence within said housing through said machine back to said blower.

2. A totally enclosed gas cooled dynamoelectric machine comprising a cylindrical housing, a longitudinally extending cooler disposed longitudinally of said housing on the outside of said housing, a rotatable shaft, a high pressure centrifugal blower mounted on said shaft at one end of said machine, a discharge volute directing ventilating gas from said blower directly into the inlet end of said cooler at one end of said housing for circulation through said cooler to the other end of said housing, said volute disposed axially of said blower with the volute chamber expanding as it spirals radially inward, said volute directing ventilating gas from said blower directly into the cooler in the inlet end thereof which serves as a high pressure collector chamber for ventilating gas discharged from said blower.

3. A totally enclosed gas cooled dynamoelectric machine comprising a cylindrical housing, two longitudinally extending coolers disposed longitudinally of said housing diametrically opposite each other on the outside of said housing, a rotatable shaft, a high pressure centrifugal blower mounted on said shaft at one end of said machine, an annular diffuser disposed concentrically of said blower, two discharge volutes directing ventilating gas from said diffuser directly into the inlet ends of said coolers at one end of said housing, said volutes disposed axially of said blower with the volute chamber expanding as it spirals radially inward, the radially outer walls of said volutes including portions of said housing, the radially inner walls of said volutes diverging radially inward over their entire length from their respective said radially outer walls, said volutes directing ventilating gas from said blower and diffuser directly into the coolers in the inlet ends thereof which serve as high pressure collector chambers for ventilating gas discharged from said blower for circulation through said coolers to the other end of said housing.

4. A totally enclosed gas cooled dynamoelectric machine comprising a cylindrical housing, longitudinally extending coolers disposed longitudinally of said housing, at least two of said coolers disposed substantially diametrically opposite each other on the outsides of said housing so that the diameter of said cylindrical housing is a minimum, each said cooler having a gas inlet and a gas outlet connected to opposite ends of said housing, a rotatable shaft, a high pressure centrifugal blower mounted on said shaft at one end of said machine, two volutes associated with said blower directing ventilating gas from said blower directly to said gas inlets of said coolers at one end of said housing for circulation through said coolers to the other end of said housing, each said volute comprising radially inner and outer walls diverging from each other within said housing, said radially outer wall of said volute including a portion of said cylindrical housing for guiding said ventilating gas in a direction of flow established by said blower to discharge from said housing directly to said gas inlets of said coolers which inlets serve as high pressure collector chambers for ventilating gas discharged from said blower.

5. A totally enclosed gas cooled dynamoelectric machine comprising a cylindrical housing, a longitudinally extending cooler disposed longitudinally of said housing on the outside of said housing so that the diameter of said cylindrical housing is a minimum, said cooler including axially aligned water heads at only one end thereof and a gas cooling portion containing a plurality of nested cooling tubes connected to said water heads and rigidly supported against axial movement only at said water heads to freely permit longitudinal expansion of said tubes, said nested tubes comprising pairs of concentrically arranged tubes connecting said water heads hydraulically in series, said gas cooling portion of said cooler having a gas inlet and a gas outlet connected to opposite ends of said housing, a rotatable shaft, a high pressure blower mounted on said shaft at one end of said machine, a volute associated with said blower directing ventilating gas from said blower directly to said gas inlet of said cooler at one end of said housing for circulation through said cooler to the other end of said housing, said volute comprising radially inner and outer walls diverging from each other within said housing, said radially outer wall of said volute including a portion of said cylindrical housing for guiding said ventilating gas in a direction of flow established by said blower to discharge from said housing directly to said gas inlet of said cooler which inlet serves as a high pressure collector chamber for ventilating gas discharged from said blower.

6. A totally enclosed gas cooled dynamoelectric machine comprising a cylindrical housing, longitudinally extending coolers disposed longitudinally of said housing, at least two of said coolers disposed substantially diametrically opposite each other on the outsides of said housing so that the diameter of said cylindrical housing is a minimum, each of said coolers including axially aligned water heads at only one end thereof and a gas cooling portion containing a plurality of nested cooling tubes connected to said water heads and rigidly supported against axial movement only at said water heads to freely permit longitudinal expansion of said tubes, said nested tubes comprising pairs of concentrically arranged tubes connecting said water heads hydraulically in series, said gas cooling portion of each said cooler having a gas inlet and a gas outlet connected to opposite ends of said housing, a rotatable shaft, a high pressure centrifugal blower mounted on said shaft at one end of said machine, two volutes associated with said blower directing ventilating gas from said blower directly to said gas inlets of said coolers at one end of said housing for circulation through said coolers to the other end of said housing, each said volute comprising radially inner and outer walls diverging from each other within said housing, said radially outer wall of said volute including a portion of said cylindrical housing for guiding said ventilating gas in a direction of flow established by said blower to discharge from said housing directly to said gas inlets of said coolers which inlets serve as high pressure collector chambers for ventilating gas discharged from said blower.

7. A totally enclosed gas cooled dynamoelectric machine comprising a cylindrical housing, two longitudinally extending coolers having longitudinally extending cooling tubes, said coolers disposed longitudinally of said housing on the outside thereof and on diametrically opposite sides thereof, a rotatable shaft, a high pressure centrifugal blower mounted on said shaft at one end thereof within said housing, two discharge volutes for said blower comprising radially inner walls diverging from radially outer walls, said radially inner walls including oppositely curved plates with the ends of one plate abutting the ends of the other plate and with opposite ends secured to said housing at diametrically opposite points adjacent said coolers, said radially outer wall of each said volute including a portion of said cylindrical housing extending to one of said coolers, each said volute guiding ventilating gas circumferentially of said housing and discharging said gas substantially tangentially thereof and transversely of a nest of said cooling tubes in an end portion of said one said cooler so that the spaces between said cooling tubes in said end portions of both said coolers serve as collectors or pressure chambers for said ventilating gas discharged from said blower.

8. A totally enclosed gas cooled dynamoelectric machine comprising a cylindrical housing, a stator having an armature winding including conductors constructed and arranged to provide ventilating passages longitudinally of said conductors through said stator with gas inlets and outlets in the end turns of said windings, a rotatable shaft, a high pressure centrifugal blower mounted on said shaft at one end of said machine, two longitudinally extending coolers disposed longitudinally of said housing diametrically opposite each other on the outside of said housing, inlet and outlet ends of said coolers connected to opposite ends of said housing, said coolers having longitudinally extending cooling tubes which extend across said inlets of said coolers, two volutes associated with said blower directing ventilating gas from said blower directly to said inlets of said coolers for circulation through said coolers to the other end of said housing, said volutes comprising outer walls including portions of said housing and inner walls diverging therefrom radially inward over their entire length, guide vanes disposed in the ends of said volutes at the inlets of said coolers for directing ventilating gas directly into the inlets of said coolers from said blower to disperse the ventilating gas between cooling tubes in said inlets, and vanes disposed in the other end of said housing at said outlets for said coolers to direct ventilating gas radially inward and in opposite directions circumferentially of said housing.

9. A totally enclosed gas cooled dynamoelectric machine comprising a cylindrical housing having a relatively low pressure gas chamber and a relatively high pressure gas chamber at opposite ends of said machine, a stator having an armature winding including conductors constructed and arranged to provide ventilating passages longitudinally of said conductors through said stator with gas inlets and outlets in the end turns of said windings in said high pressure chamber and said low pressure chamber, respectively, a rotatable shaft, a high pressure centrifugal blower mounted on said shaft at one end of said machine, two longitudinally extending coolers disposed longitudinally of said housing diametrically opposite each other on the outside of said housing, inlet and outlet ends of said coolers connected to opposite ends of said housing, said coolers having longitudinally extending cooling tubes which extend across said inlets of said coolers, two volutes associated with said blower directing ventilating gas from said blower directly to said inlets of said coolers for circulation through said coolers to the other end of said housing, said volutes comprising outer walls including portions of said housing and inner walls diverging therefrom radially inward over their entire length for directing ventilating gas directly into the inlets of said coolers from said blower to disperse the ventilating gas between cooling tubes in said inlets, and a plurality of radially and axially extending baffle plates circumferentially spaced in said high pressure chamber to prevent circumferential flow of ventilating gas adjacent the gas inlets in the end turns of said armature winding.

10. A totally enclosed gas cooled dynamoelectric machine comprising a cylindrical housing having a relatively high gas pressure chamber and a relatively low gas pressure chamber at opposite ends thereof, a stator having an armature winding including conductors constructed and arranged to provide ventilating passages longitudinally of said conductors through said stator with gas inlets and outlets in the end turns of said windings in said high pressure chamber and in said low pressure chamber, respectively, a rotatable shaft, a high pressure centrifugal blower mounted on said shaft at one end of said machine, two longitudinally extending coolers disposed longitudinally of said housing diametrically opposite each other on the outside of said housing, inlet and outlet ends of said coolers connected to opposite ends of said housing, said coolers having longitudinally extending cooling tubes which extend across said inlets of said coolers, two volutes associated with said blower directing ventilating gas from said blower directly to said inlets of said coolers for circulation through said coolers to the other end of said housing, said volutes comprising outer walls including portions of said housing and inner walls diverging therefrom radially inward over their entire length, guide vanes disposed in the ends of said volutes at the inlets of said coolers for directing ventilating gas directly into the inlets of said coolers from said blower to disperse the ventilating gas between cooling tubes in said inlets, vanes disposed in the other end of said housing at said outlets for said coolers to direct ventilating gas radially inward and in opposite directions circumferentially of said housing, and a plurality of radially and axially extending baffle plates circumferentially spaced in said high pressure chamber to prevent circumferential flow of ventilating gas adjacent the gas inlets in the end turns of said armature winding.

References Cited in the file of this patent

UNITED STATES PATENTS

| | | |
|---|---|---|
| 484,979 | Roelker | Oct. 25, 1892 |
| 1,885,546 | Rice | Nov. 1, 1932 |
| 2,186,232 | Baudry | Jan. 9, 1940 |
| 2,611,797 | Beckwith et al. | Sept. 23, 1952 |
| 2,663,808 | Rosenberg | Dec. 22, 1953 |

FOREIGN PATENTS

| | | |
|---|---|---|
| 20,819 | Austria | July 25, 1905 |
| 519,630 | Great Britain | Apr. 2, 1940 |
| 654,846 | Germany | Dec. 31, 1937 |